Feb. 24, 1953  D. W. ATCHLEY, JR  2,629,831
RADIATION SOFTENING
Filed Sept. 26, 1950  3 Sheets-Sheet 1
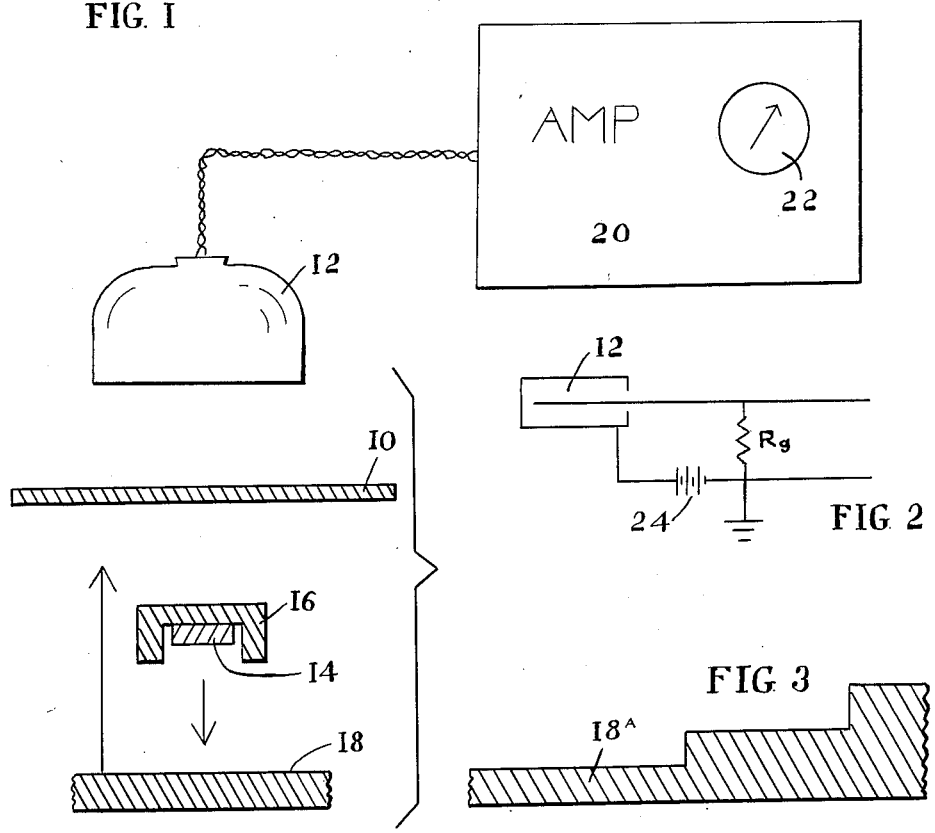

Feb. 24, 1953 D. W. ATCHLEY, JR 2,629,831
RADIATION SOFTENING
Filed Sept. 26, 1950 3 Sheets-Sheet 2

Dana W. Atchley, Jr.
Inventor
by G. R. Hulbert
Attorney

Patented Feb. 24, 1953

2,629,831

UNITED STATES PATENT OFFICE 2,629,831

RADIATION SOFTENING

Dana W. Atchley, Jr., Lexington, Mass., assignor to Tracerlab, Inc., Boston, Mass., a corporation of Massachusetts Application September 26, 1950, Serial No. 186,738

8 Claims. (Cl. 250—83.6)

This invention relates to devices and methods for employing radiations of radioactive isotopes in which it is desired to employ only radiations having predominantly a predetermined average energy level which level shall be below the average energy level of the activity of the isotope employed.

For example, radiation sources are utilized for density measurements, thickness gauges, radiography, and medical therapy. Each application requires radiations having different properties. Certain applications best utilize "soft" radiation sources, others "hard."

The nuclear reactors in use as of the end of 1949 produce a multiplicity of radioisotopes, both fission and neutron bombardment of materials. Certain of these isotopes, due to high yield, ease of separation, and longer half-lives are economical for use as fixed radiation sources. Unfortunately, there does not appear to be a series of economical isotopes having long half-lives with the desired range of energy. Hence the efforts to date have been largely spent on attempting to utilize such popular isotopes as Sr-90-Y-90, of twenty year half-life and maximum beta energy of 2.2 m. e. v.

For thickness gauge applications there should be an appreciable absorption of beta energy over the density range of the material being measured. Strontium is excellent for materials ranging in density from 30 to 500 mg./cm.$^2$. However, many of the thickness gauge applications involve the measurement of thinner materials, requiring the use of isotopes of softer average radiation which, as already pointed out, are not readily available. For this reason, an effort has been expended to soften the radiations of an existing economical isotope such as strontium.

It is possible but apparently not economical to separate the soft beta particles from the hard by magnetic or electrostatic fields. However, the method and apparatus here proposed contemplates the use of reflected and back-scattered beta particles, both of which for the purposes of this application I have called collectively "reflected particles" or "reflected radiation." Assuming that a source of Sr-90-Y-90 is utilized to irradiate a reflecting material, the energy and flux of the reflected particles is a function of the geometry, the density and atomic number of the reflector, the density and atomic number of the material between the source and reflector and behind the reflector. The reflected energy is measured normal to the reflecting surface at a point above the source and shielded from direct radiations therefrom. The material to be measured in a thickness gauge would be placed between the source, shielded therefrom, and the point of measurement.

In general, a portion of the hard beta energy is absorbed and the majority of the soft energy is reflected. It appears from preliminary experimental evidence that low Z-materials return a greater portion of the soft energy than do high Z-materials. The efficiency of soft energy reflection for infinitely thick reflectors appears relatively high. In fact, this efficiency is high enough so that the loss can be made up relatively economically, for example, by approximately doubling the amount of cheap source material, such as Sr-90-Y-90. The absorption curve for the reflected energy shows that the apparent energy has been reduced in the case of strontium roughly by a factor of two.

Reduction of energy roughly by a factor of four can be accomplished by utilizing a low Z-foil as a reflector. Here the high energy particles pass through the foil without ever being absorbed or reflected, a small fraction of medium energy particles is absorbed, whereas the bulk of the soft radiation is reflected.

From the foregoing discussion, it will be apparent that one of the principal objects of the invention is to provide a method and means of producing radiations having an average energy level lower than that of the source of radioactivity employed, said reduced level being capable of pre-selection and variation at will depending upon the particular use to be made of the radiations.

Another object of the invention, in a particular application thereof, is to provide a thickness gauge in which the material, the thickness of which is to be measured, is placed between a radioactive source and a detector, the material being shielded from the direct radiations of the source and a reflector being used to direct back scattered and reflected radiations through the material to the detector which measures the absorption of radiation in the material.

Further objects, advantages and features of the invention will become apparent from the following detailed description of a preferred embodiment thereof, taken together with the accompanying drawings in which like numerals refer to like parts in the several views, and in which, Fig. 1 is a schematic representation of a thickness gauge employing the invention;

Fig. 2 is a fragmentary circuit diagram of the device of Fig. 1;

Figs. 3 and 4 illustrates modified forms of reflectors which may be employed in the device of Fig. 1;

Figure 5:
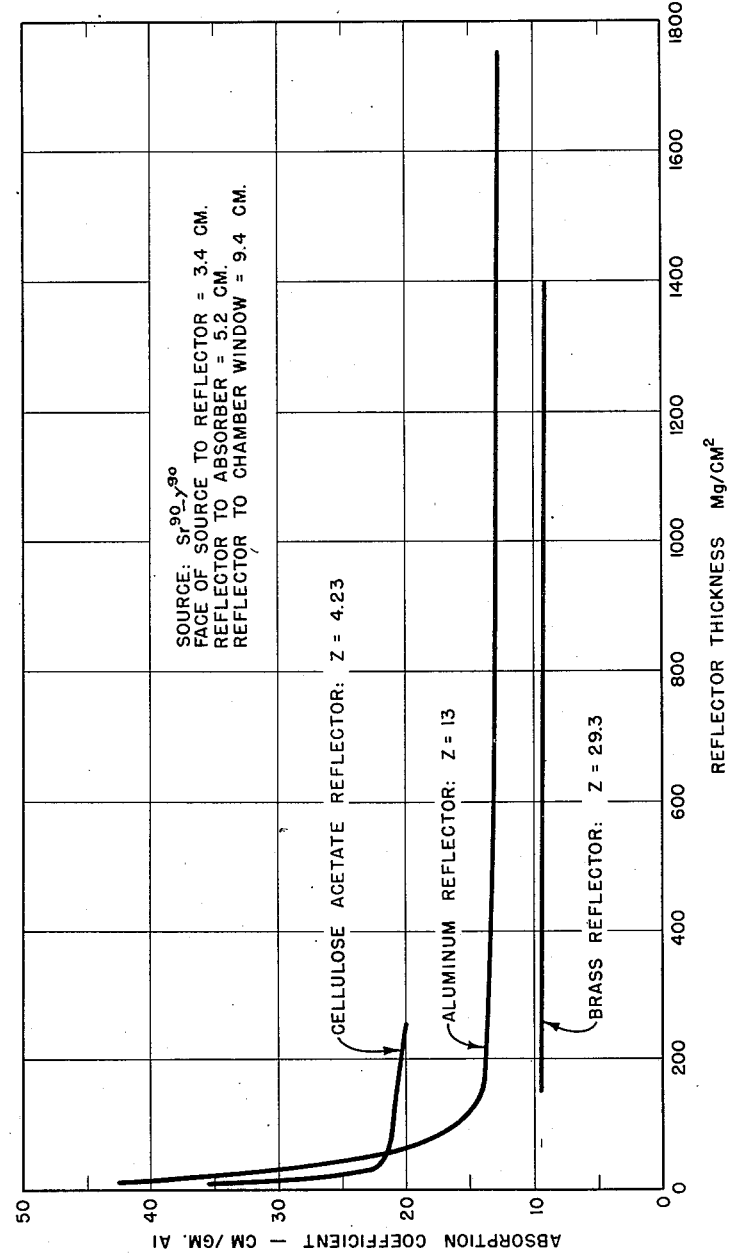
Figure 6:
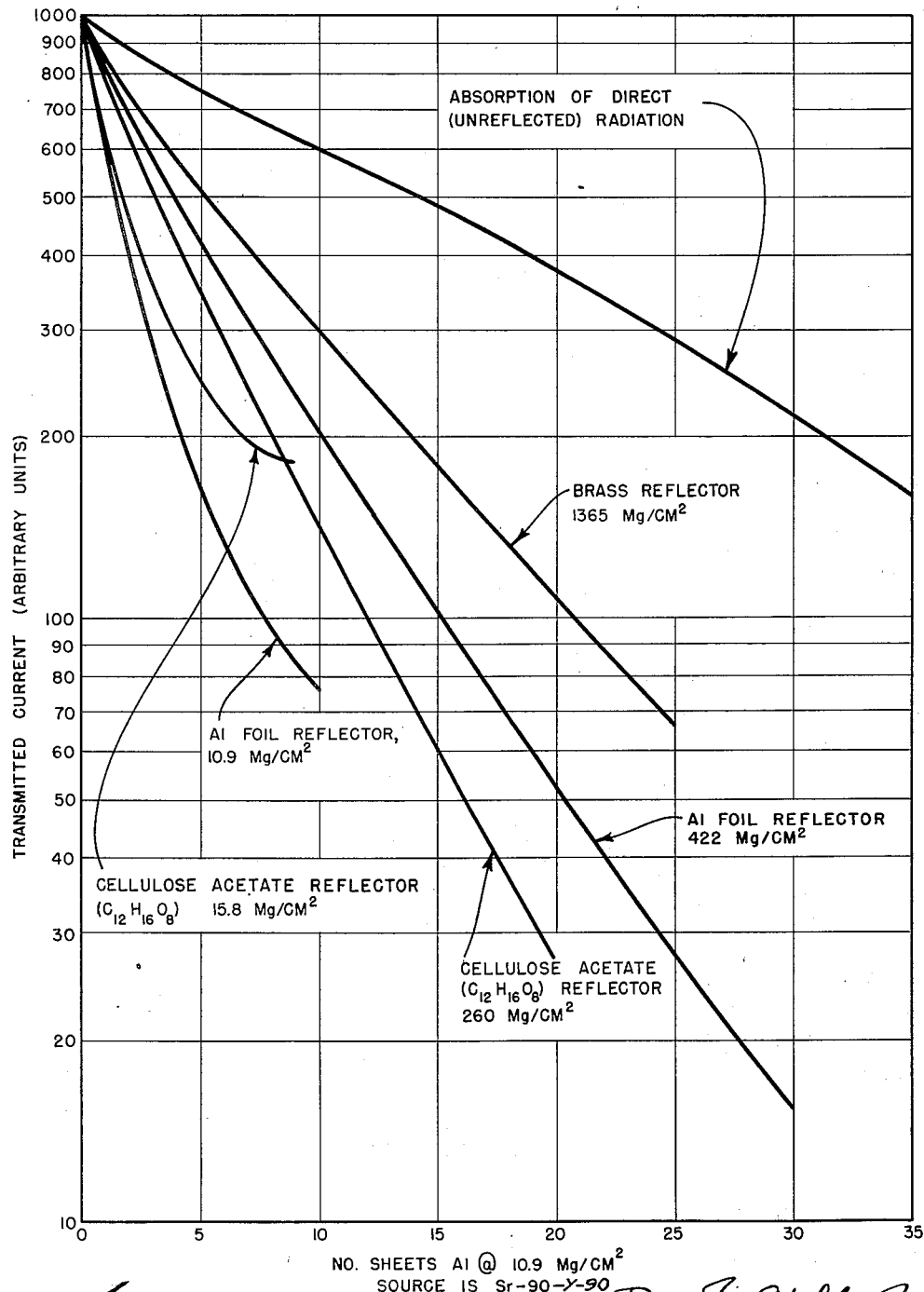

Fig. 5 is a graph on which there is plotted on the vertical axis, the absorption coefficient against thickness in milligrams per square centimeter of three reflectors of different characteristics; and Fig. 6 is another graph in which the output current is plotted on the vertical axis in arbitrary units against thickness of the absorber in terms of numbers of superposed sheets of aluminum each of a thickness of 10.9 mg./cm.$^2$, for various reflectors as compared to the absorption of direct radiation from the same source, the latter being Sr-90-Y-90.

Referring now to Figs. 1 to 4, a sheet material 10, the thickness of which is to be measured, is placed between a radiation detector 12, which may be of the ion chamber type, and a source 14 of radioactive material, such as Sr-90. However, any suitable device for measuring radiation intensity may be employed. A shield 16, for example of lead, is mounted between the radioactive source 14 and the sheet material 10 to shield the latter from direct radiations from the source. Facing the source 14 is a reflector 18 which may be of various materials having various characteristics, as will be hereinafter more completely described, in such a position that radiation from the source 14 will be returned by reflection and backscattering past the shield 16 to strike the material 10, as shown by arrows in Fig. 1. A portion of the returned radiations will be absorbed by the material 10 and the remainder, which penetrates, will bombard the ion chamber 12, developing an ionization current dependent upon the intensity of the radiation.

The output of the ion chamber 12 is fed into an amplifier 20 which amplifies the ionization current yielding a reading on the meter 22. It will be evident that other detectors for measuring the intensity of radiations may be substituted for the ion chamber and amplifier here shown.

As appears in Fig. 2, the collecting voltage for the electrodes of the ion chamber 12 is produced by means of a battery 24, and the ionization current developed produces a voltage across the resistor $R_g$. The voltage across this resistor is impressed upon the grid of an electron tube (not shown) in the amplifier to be amplified and displayed by a galvanometer or otherwise in a manner well known in the art.

Referring now to Fig. 6, the results of experiments have been plotted, using somewhat different materials and conditions. In this case the source material was Sr-90-Y-90. The distance from the face of the source to the reflector was 3.4 cm., from the reflector to the absorber 5.2 cm. and from the reflector to the chamber window 9.4 cm. Along the horizontal axis the thickness of the absorbing material is shown as a number of superposed sheets of aluminum having a density of 10.9 mg./cm.$^2$. On the vertical axis the transmitted current of the detector is shown in arbitrary units.

Referring now to the curves, I have first plotted at the top the absorption characteristics of one to thirty-five aluminum sheets subjected to direct radiation from the source, for ready comparison with the results using the invention. The next curve gives the results using a reflector plate consisting of brass of 1365 mg./cm.$^2$. The third curve shows results using a reflector consisting of an aluminum plate of 422 mg./cm.$^2$ thickness. The fourth curve shows the results using a reflector consisting of cellulose acetate of 260 mg./cm.$^2$. The fifth curve is that of the same material of a thickness of 15.8 mg./cm.$^2$, and the last curve is for aluminum of 10.9 mg./cm.$^2$.

In Fig. 5 the absorption coefficients of various materials have been plotted against reflector thickness in a similar manner.

It will be readily observed from the curves of Figs. 5 and 6 that considerable changes in the average energy level of beta particles striking the absorbing material may be effected by changing the thickness and nature of the reflector. The system according to the invention produces a radioactive thickness gauge much more versatile than any heretofore available, employing relatively cheap source materials for purposes of measuring thicknesses of materials widely varying in density and thickness.

It is evident that persons skilled in the art will be able to select other reflectors of appropriate materials and thicknesses to produce returned radiations from various different kinds of radioactive sources of almost any desired energy level below that of the unshielded source.

In Fig. 3 there has been disclosed a stepped reflector 18$^a$ which may be adjusted to present a variety of thicknesses for return of radiation from the source 14.

In Fig. 4 there is illustrated a tapered reflector 18$^b$ which may be substituted for the reflectors 18 or 18$^a$ and shifted back and forth to produce radiations of varying intensity and average energy.

The significance of the above findings is that by the use of only one or two economical long life emitters, an arrangement can be found to provide radiations of almost any energy level lower than that of the isotope used as a source. In fact by means of a tapered or stepped reflector, as described, or some similar scheme, a source of continuously variable apparent energy may be provided. The loss of flux density due to radiation can be compensated for by an iris at the source or by electrical means in the detector mechanism.

While the invention has been illustrated in connection with a radioactive thickness gauge, it will be apparent that the same may be employed for numerous other purposes since it has the great advantage of providing radiations of a wide variety of average energy from a few readily available and relatively inexpensive radioactive isotopes, thus making unnecessary the provision of a wide variety of isotopes. Thus in intensity measurements, radiography and medical therapy the invention has a wide application. Accordingly the invention is not limited to the specific embodiment illustrated, and other uses, modifications and adaptations will occur to those skilled in the art within the spirit and scope of the appended claims.

I claim:

1. In a device of the thickness gauge type in which the thickness of a material is measured by its absorption of radiations from a radioactive source, a shield arranged to be interposed between said source and said material to prevent direct radiations therefrom from reaching said material, a reflector facing said source and said material and adapted to return by reflection and backscattering a portion of said radiations past said shield to strike said material, the characteristics of said reflector being so chosen that the returned radiation will have a predetermined average energy level lower than that of direct radiations from said source, such level being determined by the absorption characteristics of said material the thickness of which is to be measured, and a detector arranged on the side of said material away from said source and shielded therefrom by said shield to detect and measure the intensity of the said returned radiations not absorbed by said material.

2. Apparatus according to claim 1 in which said reflector is of non-uniform thickness whereby the radiations returned may be varied by adjusting said reflector to expose areas of different thicknesses to said direct radiations.

3. Apparatus according to claim 2 in which said reflector is stepped to provide uniform areas of different thicknesses.

4. Apparatus according to claim 2 in which said reflector is uniformly tapered to provide areas of varying thicknesses.

5. A method of subjecting a material to radiations of predetermined average energy lower than that of the radiations of a radioactive source, which comprises shielding the material to be treated from direct radiations from the source while bombarding it substantially only with radiations from said source which have been reflected and backscattered by a reflector of predetermined characteristics.

6. A method of subjecting a material to irradiation by beta rays of predetermined average energy lower than that of direct radiations of the radioactive source employed, which comprises shielding said material from direct radiations from the source while bombarding it substantially only with beta rays from said source which have been reflected and backscattered by a reflector of predetermined characteristics.

7. Means employing a radioactive source for producing radiations directed in a desired direction and having an average energy level lower than that of direct radiations from said source, which comprises a holder for holding said source, a reflector of radiations of predetermined reflecting characteristics arranged opposite said source for reflecting radiations therefrom in said desired direction, a shield substantially impermeable to said radiations disposed on the opposite side of said source from said reflector and located to intercept and prevent the passage of substantially all direct radiations from said source in said desired direction, the characteristics of said reflector being so chosen that the reflected radiation shall have a predetermined average energy level lower than that of direct radiations from said source.

8. A device in accordance with claim 7 in which said source is an emitter primarily of beta rays.

DANA W. ATCHLEY, JR.

REFERENCES CITED

The following references are of record in the file of this patent:

UNITED STATES PATENTS

| Number | Name | Date |
|---|---|---|
| 2,378,219 | Hare | June 12, 1945 |
| 2,425,512 | Crumrine | Aug. 12, 1947 |
| 2,426,884 | Kieffer | Sept. 2, 1947 |
| 2,479,882 | Wallhausen et al. | Aug. 23, 1949 |

OTHER REFERENCES

"Nuclear Fission and Atomic Energy," Stephens Publ. of Science Press, Lancaster, Pa., 1948, pp. 123.

"Rev. of Sci. Instruments," vol. 17, #9, September 1946, pp. 348–351.